July 22, 1969  H. W. ALTER  3,457,408

TRACK-ETCH NEUTRON RADIOGRAPHY

Filed Dec. 12, 1966

INVENTOR.
HENRY WARD ALTER
BY
Christie, Parker & Hale
ATTORNEYS.

United States Patent Office 3,457,408
Patented July 22, 1969

3,457,408
TRACK-ETCH NEUTRON RADIOGRAPHY
Henry Ward Alter, Danville, Calif., assignor to General Electric Company, New York, N.Y., a corporation of New York
Filed Dec. 12, 1966, Ser. No. 601,112
Int. Cl. G01t 3/00
U.S. Cl. 250—83.1                                    7 Claims

ABSTRACT OF THE DISCLOSURE

A method and apparatus for neutron radiography using track-etch techniques is disclosed. Typically, in this system an object is placed between a neutron source and a composite consisting of a sheet of detector material and a conversion material. Neutrons passing through the object with variable attenuation, cause the emission of charged particles by the conversion material which impinge on and form damage tracks in the detector sheet. The damage tracks are enlarged by etching. Where neutron density is sufficient, a visible variable density, light scattering, radiographic image of the object results.

---

Figure 1:
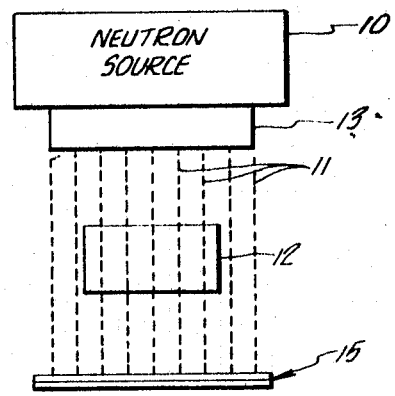

Neutron radiography is a useful inspection technique for non-destructive testing of a variety of objects. For example, when an object is constructed of both high-Z and low-Z materials (Z being the atomic number of a material), a neutron radiograph will show fine details in the low-Z material despite the presence of the high-Z material if the low-Z material contains a strong neutron scatterer or absorber. Neutron radiography is also useful in examining devices containing several high-Z materials of similar density. An example is the examination of component placement and weld penetration in nuclear thermionic devices incorporating materials such as uranium, plutonium-238, tungsten, molybdenum, and the like. The technique is also valuable in the non-destructive examination of the interior condition of highly radioactive objects such as recently irradiated nuclear fuel capsules and nuclear heat sources.

The invention is an extension of a known process called "track etching." A general description of the track-etching process appears at page A1443 of "Physical Review," volume 133, number 5A (March 1964). The process is also described in co-pending patent applications Ser. No. 176,320, filed Feb. 28, 1962, and Ser. No. 368,520, filed May 19, 1964.

The track-etching process employs a homogeneous, solid-state "detector" material which may be a crystalline solid such as mica, or a non-crystalline substance such as inorganic glass or a polymeric plastic. The detector material is irradiated by charged particles, and damage tracks are created in the material by local alteration of the material structure along the particle trajectories or penetration paths. The damage tracks are extremely small (typically having lengths of about 20 to 40 microns, and widths of less than 100 angstroms), and normally can be detected only with the aid of an electron microscope. An etching process then enlarges the track width to 1–20 microns.

For example, a sheet of polycarbonate resin (such as plastic sold under the trademark ("Lexan") or polyester resin will form damage tracks when irradiated by heavy fission fragments produced by bombarding materials such as uranium-235 or plutonium-239 with neutrons. A few materials such as cellulose nitrate will also form damage tracks along the paths traversed by alpha particles (produced, for example, by neutron bombardment of lithium-6 or boron-10). A suitable etching reagent, such as a six-normal aqueous solution of sodium hydroxide, is then applied to the detector material to dissolve the disordered regions which form the damage tracks.

It is a characteristic of the track-etching process that the etching reagent preferentially attacks the altered material along the damage track at a much faster rate than it attacks the undamaged material around the track. A pit or crater is thus formed in the material at each damage track. If the detector material is relatively thin (say 0.0005 inch), the damage tracks can extend through the sheet, and tiny holes are formed through the detector material as the etching process is carried out. Depending on the extent to which etching is carried out, these pits or holes have widths in the range of say 1 to 20 microns, and are thus visible with a conventional optical microscope. Individual etched tracks are usually too small to be readily detected by the unaided eye, although groups or clusters of many closely spaced pits or holes can be visually detected without magnification.

In accordance with the invention, the object to be inspected is irradiated with a beam of neutrons. The structural components of the object modulate the neutron beam by scattering and absorption. The modulated neutron beam impinges on a detector sheet or plate bearing a conversion material which emits charged particles in response to neutron bombardment. The charged particles in turn create damage tracks in the detector sheet, and the pattern of damage tracks forms a radiographic image of the object. After this "exposure," the detector sheet is etched to enlarge the damage tracks whereby the damage-track pattern forming the image is made visible.

The inherent resolution of this imaging system (independent of divergence of the neutron beam) is about 10 microns or better, and radiographs of high resolution are thus obtainable. The detector material is essentially insensitive to electromagnetic radiation, permitting radiography of highly radioactive objects. This insensitivity also permits the "exposed" detector sheet to be etched in full daylight, eliminating any need for darkroom facilities. The etched detector sheet can be projected or viewed directly, and is also suitable for use as a photographic "negative" from which copies can be made.

Briefly stated, the neutron-radiography apparatus of this invention comprises a source of neutrons, and a sheet of detector material spaced from the source and having the property of forming etchable radiation damage tracks when irradiated by charged particles. A conversion material is disposed on or positioned against the detector material, and has the property of emitting charged particles when irradiated by neutrons. The object to be radiographed is positioned between the neutron source and the detector material whereby neutrons passing through the object impinge on the conversion material and cause the emission of charged particles which produce etchable radiation damage tracks in the detector material to form a radiographic image of the object.

In method terms, the invention comprises the steps of first positioning the object to be radiographed between a neutron source and a sheet of detector material having the property of forming etchable radiation damage tracks when irradiated by charged particles. The detector material includes a coating of or is positioned against a conversion material which emits charged particles when irradiated with neutrons. The neutron source is then activated to irradiate the object whereby neutrons passing through the object and impinging on the conversion material cause the emission of charged particles which produce etchable radiation damage tracks in the detector material to form a radiographic image of the object. The detector material is then etched to enlarge and make visible the radiation damage tracks. If desired, the etched detector material may then be projected as a photographic negative to form any desired number of copies.

Figure 2:
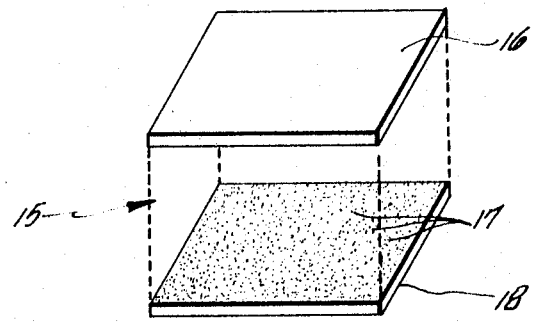

The invention will be described in detail with reference to the attached drawings, in which:

FIG. 1 is a schematic diagram showing the positioning of a neutron source, an object to be radiographed, and a radiographic plate including a sheet of detector material; and FIG. 2 is an exploded perspective view to the radiographic plate.

Referring to the drawings, a neutron source 10, such as a nuclear reactor, emits a beam of neutrons 11. An object 12 to be radiographed is positioned in the neutron beam. Preferably, the neutron source includes means for collimating the neutron beam to minimize beam divergence, and may also include a conventional shutter 13 to block the beam and thus permit access to the object without altering reactor power.

A radiographic plate 15 is positioned in the neutron beam to receive neutrons which have passed through the object. The radiographic plate is shown in exploded view in FIG. 2, and includes a sheet of detector material 16 having the property of forming etchable radiation damage tracks when irradiated by charged particles. Neutrons which traverse the detector material do not form radiation damage tracks, and it is therefore necessary to provide a conversion material 17 positioned against or coated on the sheet of detector material, the conversion material having the property of emitting charged particles when irradiated with neutrons. As shown in FIG. 2, the conversion material is dispersed as a powder on a supporting substrate 18 such as a sheet of glass or stiff plastic. The sheet of detector material and the substrate are secured together in face-to-face contact by any conventional means (not shown) to form the radiographic plate.

The detector material and conversion material are matched whereby irradiation of the conversion material with neutrons causes emission of the type of charged particles which produce etchable radiation damage tracks in the detector material. For example, it is known that sheets of polycarbonate resin (such as plastic sold under the trademark "Lexan") or polyester resin will form radiation damage tracks when bombarded by heavy fission fragments. When this type of detector material is chosen, conversion material 17 is a material such as uranium-235 or plutonium-239 which emits heavy fission fragments when irradiated with neutrons. Preferably, the conversion material is in the form of a fine powder, and is disposed in a holding matrix of plastic, glue or paint on substrate 18.

Alternatively, the detector material may be a cellulose plastic such as cellulose nitrate, cellulose acetate, cellulose tri-acetate, or cellulose acetate butyrate. These materials are known to form radiation damage tracks when bombarded with alpha particles. In this case, the conversion material is a finely dispersed powder of say lithuim-6 or boron-10 which emits alpha particles in response to neutron irradiation. Both boron-10/cellulose and uranium-235/polycarbonate-resin radiographic plates have been tested and found to provide high resolution radiographic images.

In operation, object 12 and radiographic plate 15 are positioned as shown in FIG. 1, and the neutron source is activated. Neutrons impinging on the object to be radiographed are transmitted, scattered, or absorbed, depending on the composition of the materials in the object. Neutrons passing through the object and reaching conversion material 17 give rise to charged particles which in turn form radiation damage tracks in the detector material. Exposure periods will vary depending on the material selected, but high-contrast radiographic images have been obtained with exposure periods of three to five minutes using a neutron flux of $10^6$ neutrons per square centimeter per second.

After exposure, the detector sheet is stripped from substrate 18 and the conversion material, and is processed with a suitable etchant such as sodium hydroxide to enlarge the damage tracks into pits or craters. The etching step is carried out in broad daylight, and can be completed in a few minutes using a six-normal aqueous solution of sodium hydroxide.

The etched damage-track pits or craters define a radiographc image of the object, and this image can be visually inspected by viewing the detector sheet in either transmitted or reflected light. Assuming that a reasonably transparent detector material has been selected, the etched sheet can also be projected in the same fashion as a photographic negative to make photographic copies. If a thin (say, 0.0005 inch) detector material is selected, and the damage tracks are etched into holes extending through the material, the visual imaging and copying techniques described in my co-pending U.S. patent application, Ser. No. 588,130, filed Oct. 20, 1966 are also useful.

There has been described a method and apparatus for producing neutron radiographs characterized by high resolution and insensitivity to electromagnetic radiation emitted by the object being inspected. The radiographs are quickly processed in a readily available etching solution without any need for darkroom facilities, and can be reproduced in any desired number of copies. While the invention has been described with reference to several specific types of detector materials and conversion materials, it is recognized that other types of materials are useful in practicing the invention. All such variations are intended to be encompassed within the scope of the appended claims.

What is claimed is:

1. A method of forming a neutron radiograph which comprises the steps of:
    (a) positioning in spaced relation to a neutron source a composite consisting of a sheet of detector material and in substantial contact with one surface thereof a conversion material; said detector material having the property of forming etchable radiation damage tracks when irradiated with charged particles and said conversion material having the property of emitting charged particles when irradiated with neutrons;
    (b) placing an object to be radiographed between said neutron source and said composite;
    (c) activating said neutron source to irradiate the object whereby neutrons passing through and impinging on said conversion material cause the emission of charged particles which produce a variable density pattern of radiation damage tracks in the detector material in accordance with the neutron transmitting characteristics of said object;
    (d) irradiating said object with a neutron flux of at least about $10^6$ neutrons per square centimeter per second for at least about 3 minutes; and
    (e) etching said detector material to enlarge said radiation damage tracks resulting in a visible, variable density, radiograph of said object.

2. The method defined in claim 1, in which the conversion material emits alpha particles when irradiated with neutrons.

3. The method defined in claim 2, in which the detector material is a cellulose plastic and the conversion material is selected from the group consisting of lithium-6 and boron-10.

4. The method defined in claim 3, in which a sodium-hydroxide etchant is used to etch the detector material.

5. The method defined in claim 1, in which the conversion material emits fission fragments when irradiated with neutrons.

6. The method defined in claim 5, in which the conversion material is uranium-235 and the detector material is a polycarbonate resin.

7. The method defined in claim 6, in which a sodium-hydroxide etchant is used to etch the detector material.

(References on following page)

References Cited

UNITED STATES PATENTS 2,344,042   3/1944   Kallmann et al. _____ 250—83.1
3,303,085   2/1967   Price et al.
3,335,278   8/1967   Price et al.

OTHER REFERENCES

Fleischer, Price, Walker: Tracks of Charged Particles in Solids, Science, July 23, 1965, vol. 149, No. 3682, pp. 383–393.

RALPH G. NILSON, Primary Examiner
MORTON J. FROME, Assistant Examiner

U.S. Cl. X.R.

250—83